ial length than that of the spool bore, thereby contributing to the provision of a recess in said bore disposed beyond the spindle end-face for receiving a single or duplex receptacle member including a plurality of plug-in sockets which are accessible thru a circular receptacle face-plate affixed to the spool flange next adjacent the companion cover section. The companion cover section is provided in its body portion with a circular opening having diameter substantially equalling that of the receptacle face-plate and appreciably less than that of the said spool flange. The axial dimensions of the cover sections are such that when they are assembled one to the other with spool in place on the spindle, they hold the spool to the spindle, and also their inner-wall surfaces press on the outer surfaces of the spool side flanges, thereby engendering a drag force effective on the spool which prevents too fast turning thereof upon the extension cord being unspooled in use of the device.

United States Patent

Hagstrom

[11] 3,837,448
[45] Sept. 24, 1974

[54] LINE CORD CADDY
[76] Inventor: Leonard Hagstrom, Rt. 2, Box 220, Ashland, Wis. 54806
[22] Filed: Dec. 15, 1972
[21] Appl. No.: 315,651

[52] U.S. Cl. ............................ 191/12.4, 191/12.2 R
[51] Int. Cl. ........................................... H02g 11/00
[58] Field of Search ...................... 191/12.2 R, 12.4

[56] References Cited
UNITED STATES PATENTS
2,856,470  10/1958  Hyde ................................ 191/12.4
3,369,084   2/1968  Cook ................................ 191/12.4

Primary Examiner—M. Henson Wood, Jr.
Assistant Examiner—D. W. Keen
Attorney, Agent, or Firm—J. Harold Kilcoyne

[57] ABSTRACT
An extension-cord caddy comprising a spool having an extension cord wound thereon and being encased within a stand-up type cover having a hand grip extending relatively upwardly therefrom. The cover is made up of two saucer-shaped cover sections, one cover section in its central body portion having an inwardly projecting spindle serving as a spool mounting axle. The spindle by design has substantially shorter 7 Claims, 3 Drawing Figures

PATENTED SEP 24 1974 3,837,448

LINE CORD CADDY

INTRODUCTION

This invention relates to improvements in extension cord devices, and more particularly it relates to an extension cord caddy which combines an extension-cord storage spool having an indeterminate length of extension cord wound thereon in readiness for unspooling or unreeling therefrom as needed, with a two-section stand-up type cover mounting and housing the spool, said cover being characterized by a design serving to render the device highly portable, practical and inexpensive to manufacture, and also serving to increase substantially the fields of usefulness of a spooled extension cord.

BACKGROUND OF THE INVENTION

To neatly and compactly store an indeterminate length of electric extension cord in readiness for use, it may be wound on an encased spool from which it is dispensed, i.e., unwound, as needed. However, in providing a practical and inexpensive extension-cord caddy, i.e., a spool as aforesaid encased in a portable, stand-up type cover, many objections and deficiencies of the prior art devices must be overcome.

One common problem is the winding and unwinding action of the cord, where the spool may upon unwinding turn too freely and cause backlash, and where upon winding the cord may tend to pile up and/or wind unevenly, as usually results in snarling and sometimes causing tangling of the cord and forcing the spool to rub and bind on the cover.

A practical cord-caddy must be rugged enough to withstand rough handling and dropping without damage to the spool and/or causing it to malfunction. Such is particularly true of the spool cover also, if it has a carrying handle and/or is constructed with several parts fastened together. Also, the device should be compact but still should provide enough space for multiple receptacles and a reasonable length of extension cord. It should be operable in either its stand-up or fallen-over positions to permit use under such conditions. In order to be reliable and low in cost, the device should have few parts, and the parts should be capable of being readily manufactured and assembled.

OBJECTS OF THE INVENTION

A primary object of this invention is the provision of a simple, inexpensive and reliable extension-cord caddy which solves the aforementioned problems.

A further object of the invention is to provide a reliable extension-cord caddy that is convenient to use.

Another object of the invention is to provide a cord caddy that does not tangle the cord.

SUMMARY OF THE INVENTION

Thus, in accordance with this invention an extension cord caddy comprises a preferably stand-up type cover made up of two dish (saucer)-shaped cover sections preferably of injection-molded high-impact resisting plastic, and which when assembled one to the other sandwich and encompass a cord-containing spool therebetween.

Said spool, which also is preferably fashioned from a high-impact plastic by an injection-molding process, comprises a core or hub having an axial through-bore and planar, spaced-apart, side flanges extending radially therefrom. One of the cover sections is formed in its vertical side-wall with an inwardly projecting spool-mounting spindle or stub axle which extends into the spool bore and on which the spool is adapted to rotate as the extension cord is unwound (unspooled) therefrom and rewound. The spool-mounting spindle has substantially less axial length than the spool bore, the bore-length portion which extends beyond the spindle-end face providing a counter-bore type recess which receives and mounts for rotation with the spool, receptacle means electrically connected to the innermost winding of the spooled extension cord. Said receptacle means includes a preferably circular receptacle face-plate which is secured flush against the outer planar face of that spool flange which is encased within the cover section companion to the spindle-provided cover section, and further mounts a rotatable knob which is accessible thru a circular opening in the planar, vertical side wall of said companion cover-section, which opening is shown to be substantially closed by the receptacle face plate. Thus, the knob and face-plate provide simple, effective means for manually rotating the spool on the spindle when rewinding of the spool is called for.

Said circular opening in the cover-section side wall has diameter less than the outer-edge diameter of said adjacent spool flange, such providing for the annular edge portion of said side wall which extends along said opening overhanging the annular outer-edge portion of the spool side flange. Coupled therewith, the axial dimension of each cover section is such that when said sections are assembled one to the other with the spool mounted on the spindle, they not only fully encase and securely hold the spool in place on the spindle, but also their inner-wall planar surfaces press on the planar outer faces of the spool side flanges, thereby engendering a drag or friction force on the spool of magnitude designed to prevent too rapid unspooling of the extension cord, as is likely to cause tangling and snarling thereof.

A cord caddy embodying the above inventive features is shown in the accompanying drawing, wherein.

Figure 1:
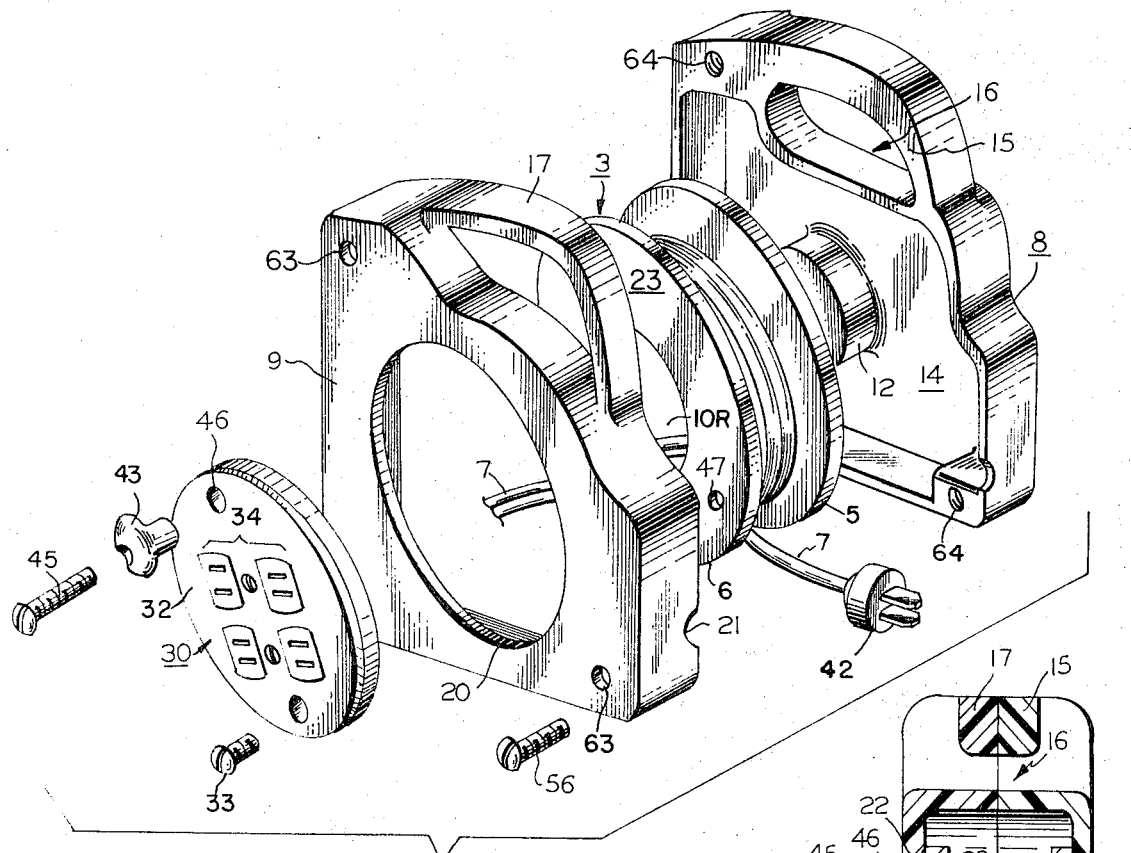
FIG. 1 is an exploded perspective view of an extension-cord caddy of the invention illustrating the parts making up same.
Figure 3:
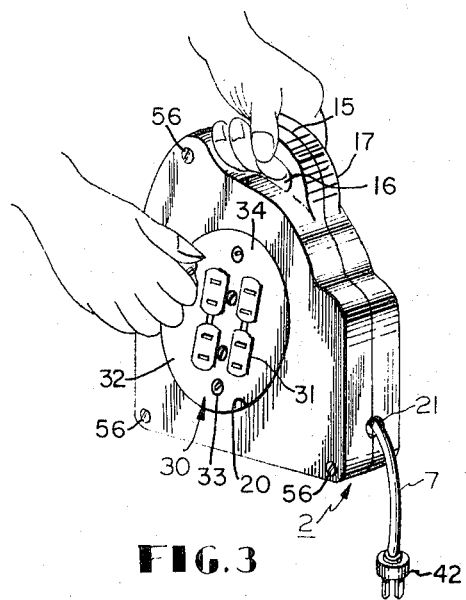
FIG. 3 is a perspective view of an assembled cord caddy of the invention, which illustrates the portable nature thereof and also the manual cord-rewinding means in operation.

Now proceeding to a more detailed description of the electrical extension-cord caddy according to the invention, such consists in the first instance of a spool 3 comprising a core or hub 4 and spaced-apart, planar side flanges 5 and 6 extending radially outwardly therefrom, on which is adapted to be wound in desirably level-wind fashion an indeterminate length of electrical extension cord 7. Said spool with the extension cord wound thereon as aforesaid is adapted to be fully encased or enclosed in a stand-up type cover 2 comprising opposed saucer-shaped cover sections 8 and 9 secured fast to one another about their peripheries by means to be hereinafter described.

As is conventional, the spool core 4 is fashioned with an axial through-bore 10 for the reception of spool mounting means about whose axis the spool is adapted to rotate as the extension cord is unwound (unspooled) from and rewound thereon, as the case may be. The present invention departs from the conventional spool-mounting means of the prior art by providing one cover section, illustratively the cover section 8, in its planar body-wall portion, with an integral, inwardly projecting cylindrical formation 12 (hereinafter termed a spindle) which extends into the bore 10 of the spool core 4, and serves as a spool-mounting stub-axle on which the spool is adapted to rotate.

According to yet another important feature of the present cord caddy, the spindle 12 has appreciably less axial length than that of the bore into which it extends, thereby contributing to the provision of a preferably enlarged-diameter recess or counter-bore 10R, in the length-portion of the bore extending beyond the spindle end. As best seen in FIG. 2, said enlarged-diameter recess or counterbore provides space for and mounts electrical receptacle means generally designated 30, which includes a receptacle box 31 closed on its open side by an extended-size illustratively circular face plate 32 whose diameter is such that it substantially fills or closes a circular opening 20 (FIG. 1) provided in the planar, vertical side wall of the companion cover section 9 and which is secured flush to and against the outer planar side face of the spool side-flange 6 as by headed screws 33. Said receptacle face plate 32 provides access to pairs of sets of single and/or duplex receptacles 34 electrically connected to the inner winding of the extension cord wound on the spool core via inner-end leads 7e which extend thereto through the bore-wall apertures 50, 51 (FIG. 2).

Figure 2:
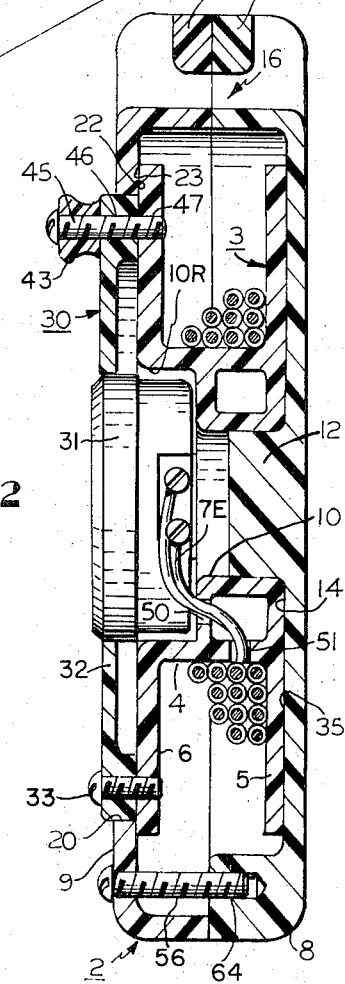
FIG. 2 is a vertical section taken thru the extension-cord caddy according to FIG. 1.

FIGS. 1 and 2 illustrate simple yet highly effective means for manually rotating the spool so as to effect rewinding of the cord following an unspooling thereof, such comprising a knob 43 rotatable on a bolt 45 threadably received in tapped openings 46 and 47 in the face plate and spool flange 6, respectively.

At this point of the description, it is explained that the outer end portion of the extension cord 7 is shown to be provided with a two-pronged or bladed plug 42 which is adapted to be plugged into an available convenience receptacle. As will be understood from FIG. 1, said extension cord can be unwound from the spool by pulling on the outer-end portion thereof, the cordcaddy cover being meantime held stationary; or the caddy, being of a portable nature, can be bodily transported, i.e., carried by hand, to a point of use, with said end portion of the extension cord held stationary or substantially so.

To prevent too fast unspooling of the extension cord, which is likely to occur and which if occurring invariably results in tangling or snarling of the cord due to over-running of the spool, the invention provides the two novel and unique features now to be described: a) - the aforesaid opening 20 in the planar side wall of the companion cover section 9 has lesser diameter than the outer-edge diameter of the spool side-flange 6, so that the cover side-wall portion extending about and defining said opening 20 overhangs the outer-edge portion of said side flange 6; and b) - the cover sections 8 and 9 in their fabrication are each provided with an axial dimension such that when said cover sections are assembled and secured one to the other, with the spool in place on the spindle 12, the total axial dimension or width of the cover is such that the inner surface 22 of the overhanging annular edge portion bounding the opening 20 presses against the outer-edge surface portion 23 of the adjacent spool side-flange 6 with substantial pressure, as in turn causes the outer planar surface 35 of the spool side flange 5 to press with corresponding pressure against the vertical planar inner-wall surface 14 of the cover section 8. The aforesaid arrangement is such that the cover will apply a friction or drag force on the spool side flanges, which by proper design is adequate to prevent too fast unspooling of the electrical cord when paying-out of the extension cord is taking place or in process.

Upon bringing the cover sections 8 and 9 together for assembly, and assuming that the spool 3 with an indeterminate length of electrical extension cord wound in "level-wind" fashion on the spool core has been earlier preliminarily mounted for rotation on the spindle 12 of the cover section 8, the cover sections may be secured fast to one another along their outer peripheries (which are formed with planar meeting edges) by bolts 56 which illustratively are passed thru approximately spaced-apart non-tapped holes 62 provided in the edge portion of the cover section 9 and thereupon threaded into tapped, correspondingly spaced-apart holes 63 provided in the meeting edge-portion of the cover section 8. When so related and secured fast one to the other, the cover sections together form a stand-up type cover capable of supporting itself in upright position (in which the spool is disposed for rotation on a horizontal axis) on a horizontal surface such as is provided by a workbench, a floor or a shelf, etc.

To augment the portability of the combined extension-cord wound spool and encasing cover as aforesaid, the cover sections 8 and 9 are provided, preferably by fabricating same integral with and so as to extend upwardly therefrom, the handgrip sections 15, 17 which together form a full handle having a hand-hole 16 when the cover sections are brought together and secured as just described.

Also, the meeting edges of the cover sections are provided either in the fabrication of the sections or by a subsequent drilling operation, with small, half-round, facing apertures which together provide a full-round cord aperture 21 in the cover, thru which the extension cord 7 passes from and to the encased spool with unspooling and/or rewinding of the cord.

Without further detailed description, it will be appreciated that an extension-cord caddy of my invention provides an improved, simplified, highly effective and practical spool-cover combination, and accordingly I claim therefor the following.

What is claimed is:

1. An extension-cord caddy comprising, in combination: a spool including a core having a bore extending axially therethrough and spaced-apart equal radial-height side flanges; a spool-encasing cover comprising companion, generally saucer-shaped cover sections and means for securing said cover sections together about their perimeters; one cover section in its central body portion having an inwardly projecting spindle mounting said spool for rotation thereon; said spindle having substantially shorter axial length than that of the spool bore, whereby a recess is provided in said bore beyond the spindle end-face; a receptacle member mounted in said recess and including a circular face-plate which is secured to the immediately adjacent spool flange; the companion cover section having in its central portion a circular opening of diameter substantially equalling that of the face plate and in which said face plate is received and which diameter further is less than that of said spool flange; the cover sections having axial dimensions such that when assembled one to the other with spool mounted on the spindle, they function to hold the spool in place on said spindle and also inner-wall surfaces thereof bear on outer-wall surfaces of both spool flanges with pressure sufficient to engender a braking force effective on the spool.

2. An extension-cord caddy according to claim 1, wherein said cover sections when assembled one to the other as aforesaid form a stand-up type spool cover having handle means extending upwardly therefrom.

3. An extension-cord caddy according to claim 2, wherein at least said cover sections proper and said handle means are fashioned complete of plastic, by injection molding same.

4. An extension-cord caddy according to claim 1, wherein said recess in the spool bore has appreciably greater diameter than that of the spindle-receiving length portion of said bore thereby to accommodate a receptacle member having greater diameter than that of said bore portion.

5. An extension-cord caddy according to claim 1, wherein the receptacle member has greater diameter than that of said spindle-receiving bore portion and said recess has correspondingly greater diameter as enables said receptacle member to be at least partially housed therein.

6. An extension-cord caddy according to claim 1, wherein said two-section spool-encasing cover is provided with an opening for the passage of an extension cord responsive to its being unspooled and respooled, said opening being located on the meeting line of said two cover sections.

7. An extension-cord caddy according to claim 6, wherein the bore-defining wall of the spool core is provided with one or more openings for the passage of electrical leads from the receptacle member to the extension-cord windings on the spool core.

* * * * *